United States Patent [19]

Lightfoot

[11] Patent Number: 5,371,370
[45] Date of Patent: Dec. 6, 1994

[54] GAMMA RADIATION CAMERA SYSTEMS

[75] Inventor: John A. Lightfoot, Beckermet, England

[73] Assignee: British Nuclear Fuels plc, Cheshire, England

[21] Appl. No.: 182,990

[22] Filed: Jan. 19, 1994

[30] Foreign Application Priority Data

Jan. 22, 1993 [GB] United Kingdom ............... 9301206

[51] Int. Cl.⁵ .................. G01T 1/20; G01D 18/00
[52] U.S. Cl. .................. 250/363.02; 250/363.09; 250/252.1
[58] Field of Search ............ 250/363.02, 363.09, 250/252 R

[56] References Cited

U.S. PATENT DOCUMENTS

| | | | |
|---|---|---|---|
| 4,014,109 | 3/1977 | Schramm | 250/363.09 |
| 4,280,047 | 7/1981 | Enos | 250/363.09 |
| 4,323,977 | 4/1982 | Arseneau | 250/363.09 |
| 4,331,869 | 5/1982 | Rocco | 250/363.09 |
| 4,499,375 | 2/1985 | Jaszczak | 250/363.09 |
| 4,527,057 | 7/1985 | Guyton et al. | 250/363.09 |
| 4,788,429 | 11/1988 | Wilson | 250/363.02 |

Primary Examiner—Paul M. Dzierzynski
Assistant Examiner—Drew A. Dunn
Attorney, Agent, or Firm—Nixon & Vanderhye

[57] ABSTRACT

A gamma radiation camera system that utilizes a gamma blocking object which is removably located in the field of view of a gamma detector and blocks at least a portion of gamma radiation, emitted from a scene, from the detector and thereby forming a two-dimensional image of the scene. Further, individual components received by the detector from the scene provide an output signal to respective processing circuitry. The difference is then determined between components of a first output signal obtained when the object is present in the field of view of the detector and components of a second output signal obtained when the object is not present in the field of view.

22 Claims, 4 Drawing Sheets

GAMMA RADIATION CAMERA SYSTEMS

BACKGROUND OF THE INVENTION

The present invention relates to gamma radiation camera systems.

Gamma camera systems are employed in the medical field for imaging the radiation emitted by a radioactive tracer source injected into a patient. The tracers are designed to be absorbed by a particular part of the body and are made radioactive with a substance such as technetium 99. The radioactivity is short lived and usually of low energy, typically 100 keV. When the tracer has been absorbed the gamma ray camera can take a picture of the tissue in question, from outside the body, as an aid to diagnosis.

Such known camera systems usually incorporate a collimator which performs a function similar to a lens in an optical camera by selecting the rays which will form a useful image. The collimator is provided by a layer of gamma absorbing material, e.g. lead typically 1 cm thick, having a multiplicity of, e.g. 40,000, parallel holes therethrough. Thus, the field of view of the camera is limited to observation of gamma rays parallel to the holes.

As noted above, the energies of gamma rays to be detected in the medical field are relatively low, e.g. 100 keV or less. However, in other applications where it is required to detect gamma rays, e.g. in the nuclear industry to examine the radiation emitted from radioactively contaminated structures, the rays may be of much greater energy, e.g. in the range 500 to 1500 keV and a higher energy collimator with a wider, diverging field of view is required. As the capability of a collimator is extended to higher energies it is required to be thicker and hence heavier. The holes become fewer and of larger diameter. The resulting spatial resolution is poorer and the assembly is difficult to mount and control. For example a collimator for work up to 600 keV would weight typically 250 kg, not including any background shielding for the rear and sides of the detector. A collimator to image the 1332 keV radiation from Cobalt-60 would be so large and heavy that it would need its own separate mount.

The parallel hole collimator forms an image which has no optical equivalent. As noted above, an image will only be formed in a narrow field of view observing only rays travelling parallel to the collimator holes, whereas all conventional optical systems are divergent and the field of view can be varied.

There are two established ways of producing a diverging field of view in a gamma camera known in the prior art. The first is to provide a multihole collimator with diverging holes. This would have a fixed field of view but could be reversed to give a converging field. It would be so heavy, typically 250 kg, that it would only be suitable only for use at a fixed installation.

The second way is to provide a so-called "pin-hole" gamma collimator. This is analogous to the optical pin hole camera. This comprises a box around the detector or imaging plane, the box having a hole between the viewed scene and the detector. The problem is again one of shielding. The box of the camera must be massive to shield the imaging plane from unwanted radiation, thereby making the camera heavy and unwieldy. The box must be long enough to give a reasonable field of view, increasing further the weight of shielding involved. Typically, a shielding box weighing several tonnes may be required. The thick shielding also means that the hole must be of large diameter and specially shaped so that off-axis objects in the scene will still illuminate the image plane. The large hole results in poor spatial resolution.

The "pin-hole" method of imaging gamma rays has several advantages over the multihole collimator. The field of view of the pin-hole camera can be varied by altering the distance of the hole from the imaging plane. The camera can also be panned from side to side or up and down by moving the position of the hole parallel to the image plane rather than moving the whole camera. However, it is not easy to change or adjust the position of the hole. Furthermore, a pin-hole collimator is less sensitive than a multihole collimator as less of the radiation reaches the imaging plane through the single hole than through the many holes of the multihole collimator.

SUMMARY OF THE INVENTION

The present invention is concerned with the use of the principle of anti-collimation to facilitate provision of a gamma camera system which overcomes the aforementioned problems. A gamma ray detector using this principle is proposed in the prior art in GB 2714732A. However, that detector is employed for measuring gamma ray flux in a small solid angle and is therefore unsuitable to employ as a camera system to form an image of a two dimensional gamma-emitting scene.

According to the present invention there is provided a gamma radiation camera system which comprises a detector means for detecting gamma radiation received from a given scene, a gamma blocking object removably locatable in the field of view of the detector means, the object when present in the field of view acting as an anti-collimator to gamma radiation from the scene, and a signal processor for processing outputs of the detector means, wherein the detector means is such as to form a two-dimensional image of gamma radiation from a two-dimensional scene, individual components of the detected two-dimensional image being simultaneously received and representing individual components of the scene and wherein the detector means provides an output signal comprising a read-out of components of the detected image and the signal processor is such as to find the difference between components of a first output signal obtained when the said object is present in the said field of view and components of a second output signal obtained when the said object is not present in the said field of view.

If gamma radiation emanates from a given source within the imaged scene the location of the gamma blocking object between the source and the detector means enables the source to be detected by anti-collimation. By forming an image of the scene with the blocking object present the radiation from the said source will be substantially blocked and not detected by the detector means. By forming an image of the scene with the blocking object removed the said source sill be detected by the detector means. Thus, subtraction of the said first output from the said second output of the detector means, which respectively represent images with and without the blocking object present, represents a resultant indicating gamma radiation from the given source.

In practice, the detected scene may contain a plurality of regions emitting or re-transmitting from sources elsewhere gamma radiation and these regions may be regarded as point or diffuse or distributed sources (as appropriate). Desirably, the blocking object is locatable at different positions within the field of view of the detector means whereby gamma radiation from various regions in a scene may be selectively blocked in turn anti-collimation images being taken for each position and resultants formed for each in turn by subtraction from the corresponding image for the scene observed without the gamma blocking object. As is illustrated below, variation of the position of the blocking object (a) along an axis normal to the detector means; and (b) lateral to that axis; is very respectively analogous to zoom and panning facilities obtained using a conventional optical camera. Furthermore, use of the blocking object in two different positions on opposite sides of the said axis can provide a stereoscopic image of the gamma-emitting or -transmitting scene.

The said detector means may comprise a known gamma detector together with an associated device for producing an electronic output signal in response to the gamma detector producing an output. For example, the gamma detector may comprise a layer of scintillator material, such as sodium iodide, and the associated device may comprise a photoelectric detector capable of detecting scintillations by the scintillation material, Light guides, e.g. optical fibres, e.g. embedded in a known way in a plate made of glass or plastics material, may be employed to transmit scintillations from the scintillator material to the photoelectric detector. The photoelectric detector which may comprise a plurality of devices, e.g. photodiodes, may be of smaller area than the scintillator material and in order to ensure that all of the active light emitting surface of the scintillator material is optically coupled to the photodetector the light guides may be in the form of converging guides, e.g. in a frusto-conical shaped plate.

Desirably, the detector means is capable of producing output signals which provide information about the position in a scene of one or more sources (primary sources or retransmitting regions) of gamma radiation. For example, the detector means may comprise a scintillator and associated photodetector wherein the photodetector is constructed, e.g. as in a matrix array, or is electronically scanned in a known way, e.g. as for the detector of a conventional optical video camera, so that components of the output signal correspond to pixels within the image of the detected scene. Information corresponding to such pixels may be produced in digital form by converting the analogue signal provided as an output by the detector means into a series of digital values in a known way in the said processor prior to finding the difference between the said first and second outputs of the detector means. In the formation of the resultant image by obtaining the difference between the said first and second outputs of the detector means the procedure is carried out in the said processor by comparing the two signals on a pixel-by-pixel basis.

Preferably, the detector means is able to provide output signal components representing individual pixels in parallel so that the data collection time may be minimised. This may be achieved using a matrix of photodetectors associated with a scintillator whereby signals produced by individual photodetectors associated with regions of the scintillator represent individual pixels. The photodetectors may for example be in 64×64 unit matrix.

The said processor may provide for each region of the scintillator material addressed sequentially three output digital quantities which may respectively represent the two spatial co-ordinates of the region of the scintillator material concerned and a measure of the energy of the interaction caused by any gamma ray which has impinged upon the scintillator material in that region.

The said processor may comprise an electronics unit for forming the said quantities and a computer for processing signals comprising the said quantities. The computer may have at its output a display, e.g. a conventional display for displaying a visual or pictorial image of the detected scene. The display may be any of the known kinds of display for displaying two-dimensional visual images of a detected scene, for example a video display unit (VDU), or a matrix addressed electro-optical display incorporating liquid crystal, electroluminescent, plasma panel, electrochromic, electrohphoretic or other known electro-optical display medium and/or means for producing separate photographic prints of the detected image.

Desirably, the system includes additionally a camera for detecting visible and/or infra-red radiation, e.g. an optical video camera, the camera being locatable to detect a visible and/or infra-red image from the same scene as the detected gamma image. Desirably, the optical camera is located with its focus in substantially the same position as occupied by the blocking object when present in the gamma imaging system. The said processor desirably includes means for superimposing a signal representing the resultant of the gamma images (with and without the gamma blocking object) upon a signal representing the visible and/or infra red image whereby a combined image may be formed showing the location of gamma sources in the scene. A signal representing such an image may be fed to and displayed upon the said display. The detected site(s) of a source of gamma radiation in the gamma scene may be denoted for example in one or more highlighting colours on the visual display.

The background optical image may be provided on the display in monochrome and the images of detected gamma emitting or transmitting regions may be provided in colour. Different colours may be used to indicate gamma sources of different energies as follows.

The gamma detector means is capable of acting as a spectrometer as well as intensity measuring device. Thus, radiation may be detected as being in a given energy region, e.g. from within a given gamma-emitting photopeak, by comparison within the processor, e.g. computer with known signals stored therein representative of different energy levels. When signals representing rays within a given photopeak are detected the image of that one photopeak may be separated from other gamma photopeak images and processed separately. In this manner, outputs from the processor may be provided in a form distinctive of the type of photopeak detected whereby different detected photopeaks may be displayed each in a different form, e.g. in different colours, on the display. By this technique of discrimination of the different photopeaks radiation from different gamma-emitting isotopes may be detected and identified. Different detected intensities within a chosen energy photopeak or range or for all energy ranges may be displayed according to a chosen darkness scale in a given colour. For example, a weak intensity may be displayed as dark red on the display and a strong intensity may be displayed as bright red.

The gamma blocking object employed in the camera system of the present invention is desirably one which presents a circular blocking envelope to incident gamma rays. The object is desirably a sphere although it may be a disc or a cylinder or a hemisphere or a spheroid. The body is desirably made of a relatively heavy gamma absorbing material, preferably one which attenuates at least 95% of the power of the incident radiation. The object may be a known gamma absorbing metal, e.g. lead or tungsten, or a composition containing one of these, e.g. tungsten or lead particles or pellets embedded in an organic resin matrix. It could instead be a denser but more expensive metal, e.g. silver, gold, osmium or uranium. The size of the object determines the spatial resolution of the image formed by the camera system. The diameter of the object is desirably in the range 1 to 100 mm, e.g. 2 to 20 mm. In any event, the size of the object desirably is significantly smaller than, e.g. having a diameter less than one tenth of the average diameter of, the detector surface measured perpendicular to its axis, in order to form a suitable image.

The gamma blocking object is desirably mounted on a movable arm which permits the body to be located and removed as required in the field of view of the detector means, e.g. by a pneumatically operated mechanism. The average position of the body when located in the field of view of the detector means is on the normal to and axis of symmetry of the detector means although different images may be formed by locating the body at different positions lateral to this axis as well as at different positions along the axis.

The present invention has the advantages of the pin-hole gamma camera referred to above in that the field of view is divergent so that the size of the viewed scene is not limited as with the parallel hole collimator. However, the resolution obtained is much better than for the pin-hole gamma camera. As with the pin-hole gamma camera the present invention allows zoom, panning and stereo images to be provided but in a simpler manner giving a greater degree of flexibility and control over the choice of field of view. Furthermore, the amount of gamma blocking material employed to provide the gamma anti-collimation body is very much less than that required for the radiation shielding box of the gamma pin-hole camera or for the collimator of the collimator-type gamma camera. Beneficially, the system according to the present invention can therefore be made much lighter and can give much better images than prior art gamma camera systems which would be designed for use at the same gamma energy levels.

As noted above, the prior art detector described in GB 2154732A is not suitable for use in a static two-dimensional gamma camera system. The prior device is a zero dimensional imager. That is to say it takes a measurement in only one direction at once. The present invention is a two-dimensional imager. All the image is taken in one go. This reduces the exposure time of the device by N, the number of pixels in the image, compared with the prior device. This number N could be hundreds or thousands.

As the anti-collimator or blocking object is viewed by the imaging backplane from a wide range of angles, it should desirably have the same cross section from all these points of view so that it has a pixel shape which is constant over the whole image. A long cylinder, as in the prior specification, of GB 2154732A is not suitable.

Desirably a sphere is sued as int he present invention. As the anti-collimator cannot be long, it must be very dense, so as to absorb sufficient radiation. Tungsten, uranium or gold should desirably be used rather than lead as described in GB 2154732A otherwise the sphere is large and the pixel diameter is too big.

The present invention can use a scintillator for the detector and so a gamma spectrum can be obtained for each pixel in the image. This allows the isotopic distribution in the image to be mapped as exemplified below. Such gamma spectrometry in a gamma camera system is not disclosed in the prior art.

The gamma camera system according to the present invention may be employed in a fixed application site, e.g. in a cell which may for example be concrete-lined for the investigation of waste and scrap materials obtained from the maintenance, repair of decommissioning activities at nuclear plants or installations. Alternatively, since the camera system may be produced in a relatively lightweight form it may be mounted on a transportable structure, e.g. a trolley, and transported to a site of use, e.g. a nuclear plant or installation being decommissioned.

In a particularly preferred form of the camera system according to the present invention the system includes in front of the detector means, is between the detector means and the scene to be imaged thereby, a sheet of gamma blocking material the sheet having a having a gamma transparent region, e.g. hole, capable of being blocked by the said gamma blocking object, e.g. sphere, when located in position in the field of view of the detector means. Such a sheet helps to reduce the effect of extraneous radiation incident upon the detector means and thereby allows the image formed by the camera system to be enhanced in quality by increasing the signal to noise ratio. The sheet partially provides the same effect as the radiation-tight box of a pin-hole gamma camera. However, it is not necessary to provide a complete box structure or thick shielding (as required with the known pin-hole gamma camera) to obtain an image enhancement and therefore the additional weight caused by use of the additional gamma blocking material can be minimised. The material of the gamma blocking sheet may comprise a single gamma absorbing material having a thickness of 5 mm or less, e.g. 3 mm, but conveniently may comprise a composite of materials, e.g. a sandwich of lead or tungsten containing material together with a lighter material, e.g. aluminium and/or an organic resin or plastics material, to absorb extraneous gamma radiation of different energies including low level gamma radiation produced in the sheet by collisions of the primary radiation photons with atomic particles therein.

Embodiments of the present invention will not be described by way of example with reference to the accompanying drawings, in which:

DESCRIPTION OF THE PREFERRED EMBODIMENTS

Figure 1:
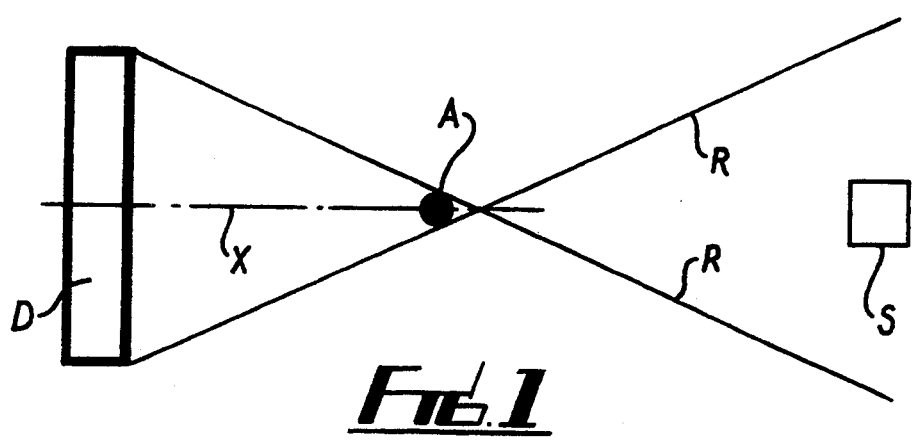
FIGS. 1, 2 and 3 are ray diagrams illustrating the principle of imaging using anti-collimation as employed in the present invention.

FIG. 1 illustrates the principle of use of anti-collimation as employed in the present invention. A detector means D is exposed unshielded to the scene which contains a gamma source S and a first electronic image comprising a plurality of pixels representing the scene is formed thereby. A small shield or anti-collimator A is then inserted on the axis X which is the axis of symmetry of and normal to the detector means D between the detector means and the source S and a second electronic image is formed by the detector means D. The second image contains no contribution from the source S if the anti-collimator A is effective because radiation from the source S is blocked by the anti-collimator A. The contribution by the source S the scene can then be found by subtracting the second image from the first image on a pixel-by-pixel basis to form a resultant image. The limits to the diverging field of view of the detector D from the anti-collimator A are illustrated by the rays R from the scene.

Figure 2:
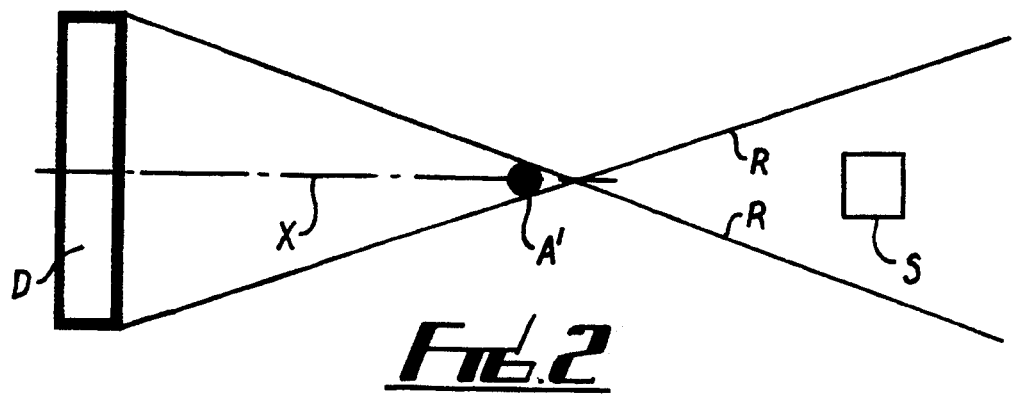

FIG. 2 illustrates how a zoom facility may be achieved using the arrangement illustrated in FIG. 1. By varying the position of the anti-collimator A on the axis X to the position A' the angle of divergence of the rays R is changed.

Figure 3:
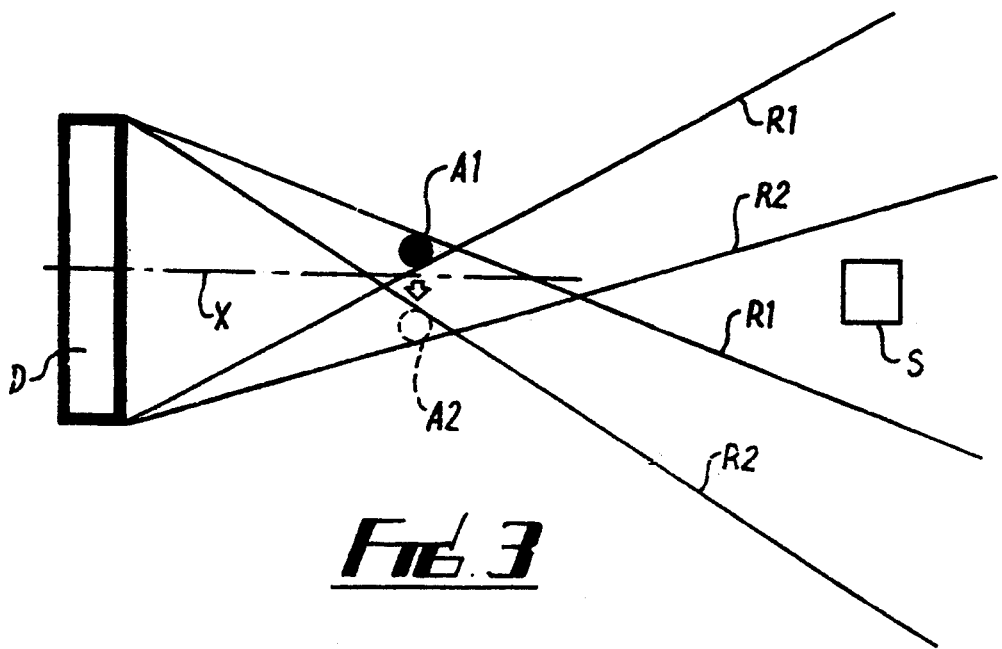

FIG. 3 illustrates how a panning and stereoscopic facility may be achieved using the arrangement illustrated in FIG. 1. By moving the anti-collimator A laterally of the axis X, e.g. first to a position A1 and then to a position A2, the field of view is changed from that represented by the rays R1 to that represented by the rays R2. Stereoscopic resultant images are formed by separately subtracting the images obtained by the detector means D with the anti-collimator respectively in positions A1 and A2 from the image formed by the detector means D without the anti-collimator A.

Figure 4:
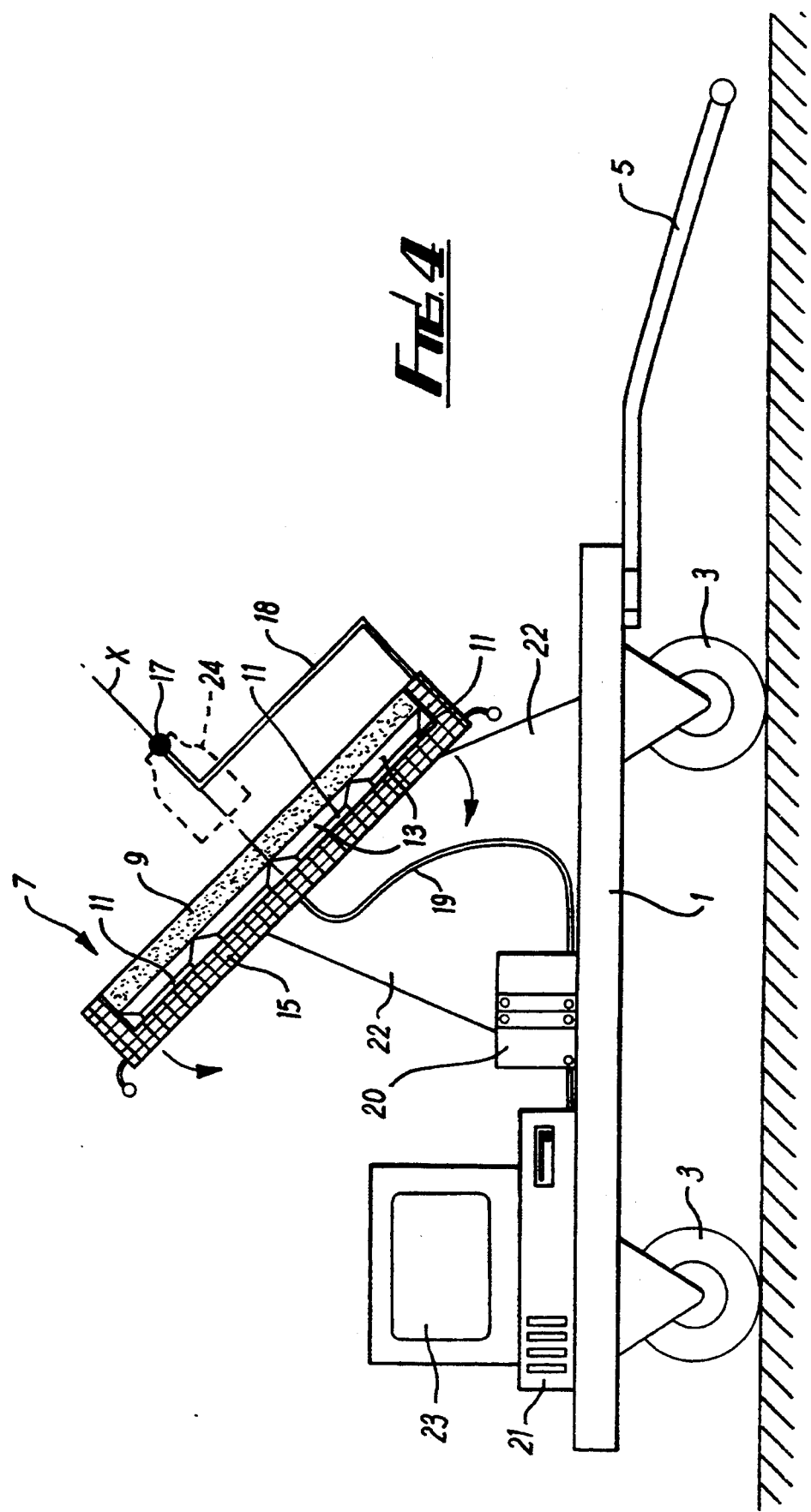
FIG. 4 is a side view of a gamma camera system.

The system shown in FIG. 4 is a transportable system which operates on the principle described above with reference to FIG. 1. The system is mounted on a trolley 1 having wheels 3 and a handle 5. The system comprises a detector means 7 comprising a scintillator detector crystal 9, a matrix of photodiodes 11 and between the crystal 9 and photodiodes 11 conical plates of fibre-optic light guides 13 allowing scintillations from a given region of the crystal 9 to be detected by a given associated photodiode 11. The photodiodes 11 are of smaller are than the crystal 9 and are shown with optional gaps between them. Gama shielding material 15 is fitted around the base of the detector means 7 so that gamma radiation is incident upon the crystal 9 only from the region is front of the crystal 9, i.e. diagonally above the crystal 9 as shown. An anti-collimator sphere 17 of diameter 16 mm and weight 35 grammes which is made of tungsten is mounted on a movable arm 18 and may be located as required on the axis X which is the axis of symmetry of and normal to the detector means 7.

Output signals from the photodiodes 11 are collected via a lead 19 to an electronics unit 20 which converts outputs from the photodiodes 11 into a form suitable for further processing by a computer 21. The signals from the electronics unit 20 comprise three digital, e.g. 8-bit, quantities. The first two quantities represent the spatial co-ordinates of the gamma ray's intersection with the crystal 9 and the third represents the energy of the interaction. The computer 21 receives these, e.g. via a parallel input/output card, and stores them in memory and then processes them into an image in the manner disclosed above using standard digital signal processing techniques. The computer 21 provides its output to form an image on an associated display 23.

The detector means 7 and the arm 18 connected thereto are attached pivotally to a mount 22 on the trolley 1 whereby the detector means 7 can be adjusted to face a given target or scene to be imaged as indicated by the arrows shown in FIG. 4.

In use, an image of the scene of interest is formed without the sphere 17 in front of the crystal 9 and then another image of the scene is formed with the sphere 17 in position in front of the crystal 9. The outputs from the photodiodes 11 which comprise signals corresponding to these two different images are provided in turn as inputs to the computer 21 which stores them and then carries out a subtraction of one from the other on a pixel-by-pixel basis to form a resultant.

After formation of the gamma image using the sphere 17 in the above manner an optical image of the same scene is also formed by an optical video camera 24 indicated by a dashed line in FIG. 4 located substantially in the position previously occupied by the sphere 17 whereby the video camera 24 forms an optical image of the previously detected gamma scene. A signal representing the optical image is fed as a further input to the computer 21 where the resultant of the subtraction is superimposed upon that signal by known signal processing procedures as employed in the processing of television picture signals. The combined signal resulting from this superimposition is then provided as a video input signal to the display 23. The display 23 thereby provides a visual image of the detected scene with locations of any gamma sources found highlighted within the image. Such locations may for example be seen as a cluster of pixels within the image and such pixels may be highlighted by a display colour different from the rest of the image. The background optical image may be provided in monochrome and the images of detected gamma sources may be provided in colour. Different colours may be used to indicate gamma sources of different energies and different shades may be used to indicated different gamma intensities.

Figure 5:
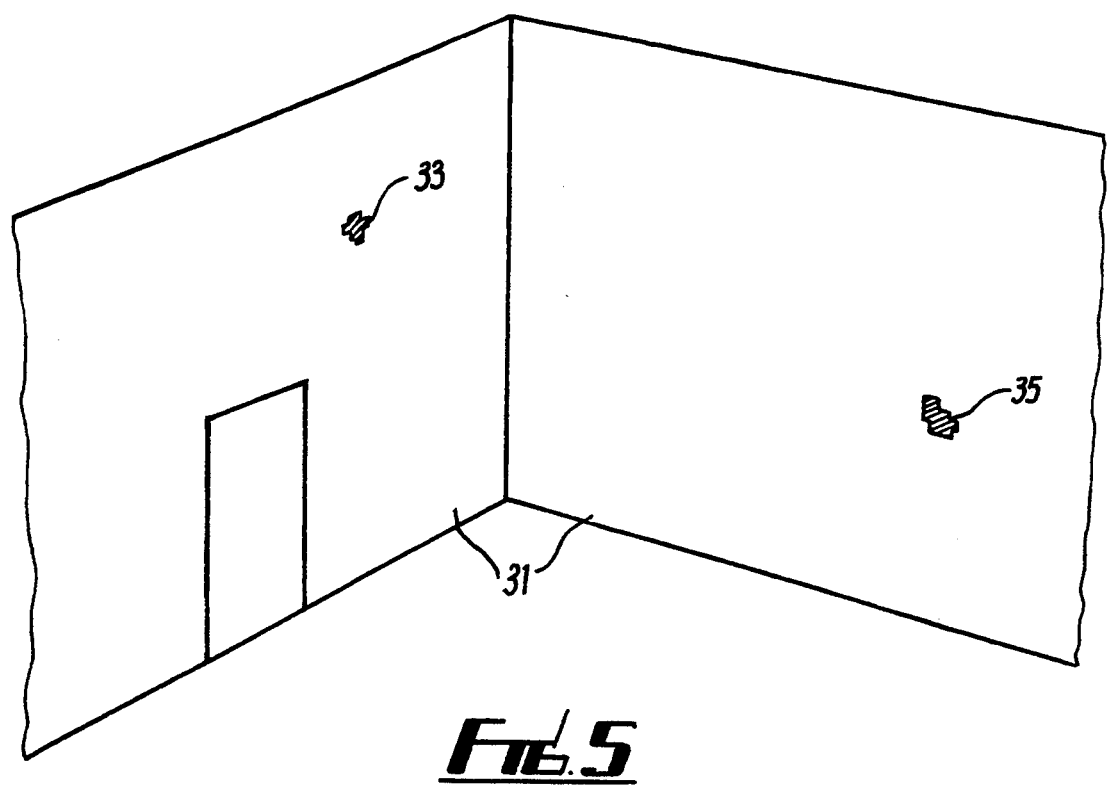
FIG. 5 is a side view of a visual image of a scene on the display of the system shown in FIG. 4.

FIG. 5 shows an example of an image obtained on the display 23. The image comprises a picture of the inside walls 31 of a building being examined prior to being decommissioned. On the walls 31 there are two gamma sources 33, 35 detected by the gamma imaging procedure described above. These sources 33, 35 comprise different radioactive isotopes and are highlighted on the display 23 in two different colours contrasting with the monochrome background obtained from the optical video camera 24.

Figure 6:
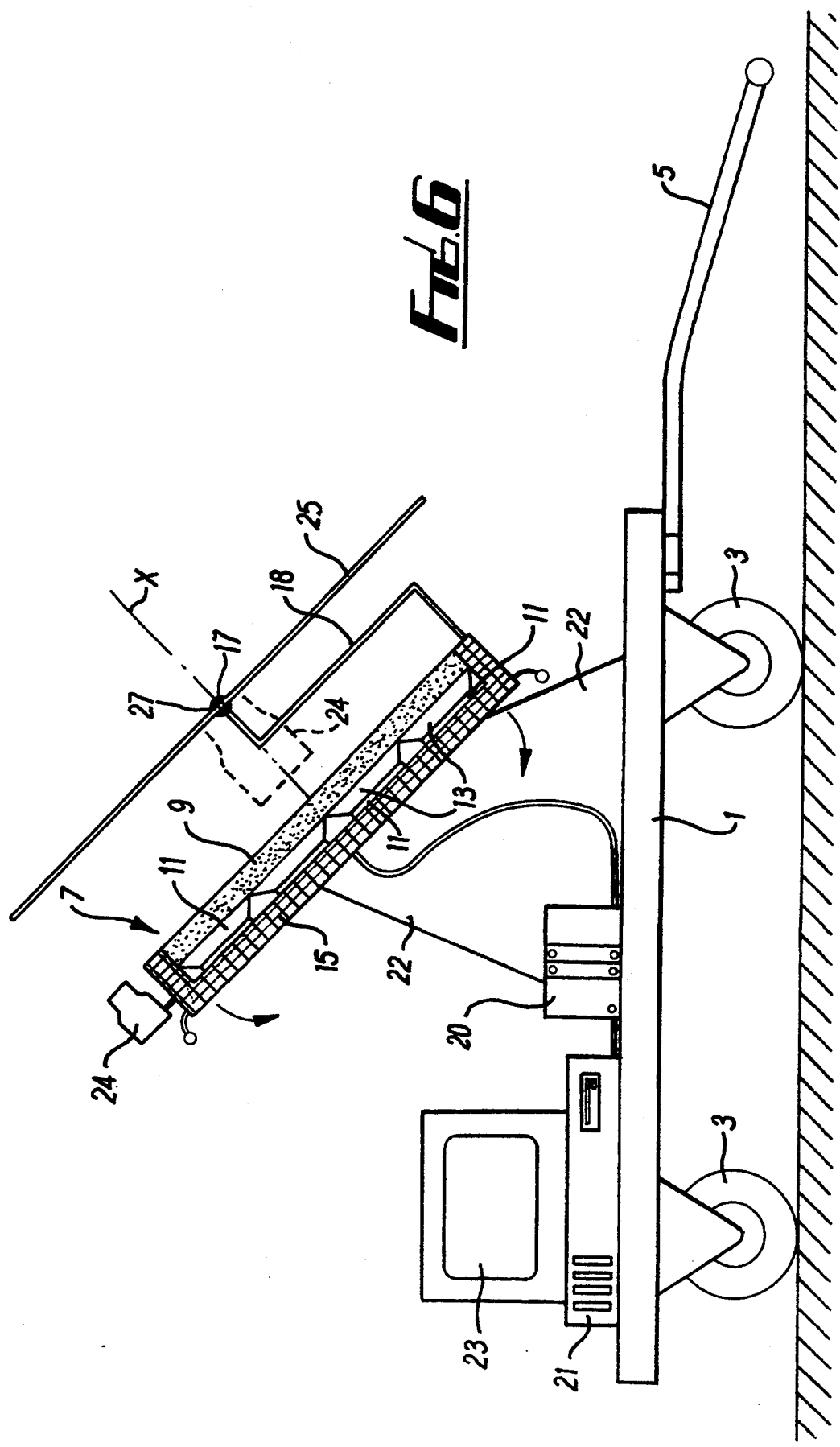
FIG. 6 is a side view of a modified gamma camera system.

The modified camera system shown in FIG. 6 contains the same items as that shown in FIG. 4, like items being indicated by like reference numerals, and includes also a sheet 25 of gamma shielding approximately 3 mm thick located in front of the crystal 9 in a plane parallel thereto. The sheet 25 contains a small hole 27 on the axis X. The sphere 17 when moved into position is capable of blocking the hole 27.

In use of the system shown in FIG. 6 a first gamma image of the scene is formed with the sheet 25 in position but without the sphere 17. A second image is then formed with the sphere 17 blocking the hole 27. In the computer 21 a resultant is formed by subtracting on a pixel-by-pixel basis the signal representing the second image from the signal representing the first image and the resultant is then superimposed upon a signal representing the optical image produced by the camera 24 of the same scene; the superimposed image is displayed on the display 23 as in the system shown in FIG. 4. The sheet 25 helps to reduce signal to noise ratio of the detected gamma image in the manner described above.

I claim:

1. A gamma radiation camera system which comprises a detector means for detecting gamma radiation received from a given scene, a gamma blocking object removably locatable in the field of view of the detector means, the object when present in the field of view acting as an anti-collimator to gamma radiation from the scene, and a signal processor for processing outputs of the detector means, wherein the detector means is such as to form a two-dimensional image of gamma radiation from a two-dimensional scene, individual components of the detected two-dimensional image being simultaneously received and representing individual components of the scene and wherein the detector means provides an output signal comprising a read-out of components of the detected image and the signal processor is such as to find the difference between components of a first output signal obtained when the said object is present in the said field of view and components of a second output signal obtained when the said object is not present in the said field of view.

2. A system as in claim 1 and wherein the blocking object is locatable at different positions within the field of view of the detector means whereby gamma radiation from various regions in a scene may be selectively blocked in turn anti-collimation images being taken for each position and resultants formed for each in turn by subtraction from the corresponding image for the scene observed without the gamma blocking object.

3. A system as in claim 1 and wherein the said detector means comprise a gamma detector together with an associated device for producing an electronic output signal in response to the gamma detector producing an output, the gamma detector comprising a layer of scintillator material, and the associated device comprising a photoelectric detector capable of detecting scintillations by the scintillation material.

4. A system as in claim 3 and wherein light guides are employed to transmit scintillations from the scintillator material to the photoelectric detector.

5. A system as in claim 4 and wherein the light guides are in the form of converging guides.

6. Apparatus as in claim 4 and wherein the said processor is such that formation of the resultant image by obtaining the difference between the said first and second outputs of the detector means is carried out in the said processor by comparing the two output signals on a pixel-by-pixel basis.

7. A system as claim 1 and wherein the processor includes a computer having an output connected to a display to provide a visual or pictorial image of the detected scene.

8. A system as in claim 1 and wherein the system includes additionally an optical camera for detecting visible or infrared radiation such camera being locatable to detect a visible or infrared image from the same scene as the detected gamma image.

9. A system as in claim 8 and wherein the said processor desirably includes means for superimposing a signal representing the said resultant of the gamma images of the detected scene upon a signal representing the visible and/or infrared image thereof whereby a combined image may be formed showing the location of gamma sources in the scene.

10. A system as in claim 9 and including a display on which said combined image is displayed, the detected site(s) of a source of gamma radiation in the gamma scene in the displayed image being indicated by a highlighting color within the displayed image.

11. A system as in claim 10 and wherein the display is such that the background optical image is provided on the display in monochrome and the images of detected gamma emitting or transmitting regions are provided in color.

12. A system as in claim 11 and wherein the said display is such that different colors are used to indicate gamma sources of different energies.

13. A system as in claim 12 and wherein the said display is such that different shades of a color are used to indicate gamma sources of similar energy but different intensities.

14. A system as in claim 1 and wherein the gamma blocking object is one which presents a substantially circular blocking envelope to incident gamma rays.

15. A system as in claim 14 and wherein the said gamma blocking object comprises a sphere, a disc, a cylinder, a hemisphere or a spheroid.

16. A system as in claim 1 and wherein the gamma blocking object comprises a gamma absorbing material which attenuates at least 95 percent of the power of the incident radiation.

17. A system as in claim 16 and wherein the said gamma blocking object comprises material which comprises one or more of lead, tungsten, silver, gold and osmium.

18. A system as in claim 1 and wherein the gamma blocking object has an average diameter in the range 1 mm to 100 mm.

19. A system as in claim 18 and wherein the gamma blocking object has an average diameter in the range 2 mm to 20 mm.

20. A system as in claim 1 and wherein the gamma blocking object is mounted on a movable arm which permits the body to be located and removed as required in the field of view of the detector means.

21. A system as in claim 1 and wherein the system is mounted on a transportable structure.

22. A system as in claim 1 and wherein the system includes between the detector means and the scene to be imaged thereby a sheet of gamma blocking material the sheet having a having a gamma transparent region capable of being blocked by the said gamma blocking object when located in position in the field of view of the detector means.

* * * * *